United States Patent [19]
Hasushita

[11] Patent Number: 6,075,645
[45] Date of Patent: Jun. 13, 2000

[54] REAL-IMAGE FINDER OPTICAL SYSTEM

[75] Inventor: Sachio Hasushita, Saitama-ken, Japan

[73] Assignee: Asahi Kogaku Kogyo Kabushiki Kaisha, Tokyo, Japan

[21] Appl. No.: 09/356,461

[22] Filed: Jul. 19, 1999

[30] Foreign Application Priority Data

Jul. 21, 1998 [JP] Japan ................................ 10-204159

[51] Int. Cl.[7] ........................... G03B 13/06; G03B 13/02
[52] U.S. Cl. ......................... 359/431; 359/362; 396/386
[58] Field of Search .................................. 359/362, 618, 359/420–422, 431–433, 642, 646, 717, 630; 396/296, 373–386

[56] References Cited

U.S. PATENT DOCUMENTS

| | | | |
|---|---|---|---|
| 4,429,978 | 2/1984 | Ikari | 396/385 |
| 5,400,101 | 3/1995 | Yoneyama et al. | 396/386 |
| 5,475,458 | 12/1995 | Arai | 396/386 |
| 5,739,956 | 4/1998 | Ohtake | 359/643 |
| 5,752,107 | 5/1998 | Hasushita et al. | 359/431 |

*Primary Examiner*—Thong Nguyen
*Attorney, Agent, or Firm*—Greenblum & Bernstein, P.L.C.

[57] ABSTRACT

A real-image finder optical system is provided with an information display element located between an image plane of an objective optical system and a moving lens group of the objective optical system, and a partial mirror surface provided on an object side with respect to the information display element. The finder optical system includes the objective optical system having a positive power, an erecting optical system for erecting a reversed real image formed by the objective optical system, and an eyepiece optical system for observing the real image. Magnification of the finder optical system varies with the movement of at least one moving lens group of the objective lens system in a direction of an optical axis.

15 Claims, 11 Drawing Sheets

FIG. 2

REAL-IMAGE FINDER OPTICAL SYSTEM

BACKGROUND OF THE INVENTION

The present invention relates to a real-image finder optical system provided in a camera independently of a photographing optical system, and more specifically, to a real-image finder optical system that is capable of displaying information in the field of view thereof.

A real-image finder that is provided independently of a photographing optical system includes an objective optical system having a positive power, an erecting optical system for erecting a reversed image formed by the objective optical system, and an eyepiece optical system for observing the erected image in a magnified fashion. The above described optical systems are provided in this order from an object side. In a camera having zoom lens, the finder optical system is also provided with zoom function. Namely, at least one lens group of the objective optical system is movable along an optical axis to change the magnification of the finder according to the zooming of the photographing optical system.

In general, the real-image finder is provided with an information display element in the vicinity of an image plane of the objective optical system to display information in a field of view of the finder. The displaying element may be a transparent member on which an opaque pattern is formed to thereby shield incident light from an object. A frame indicating a photographing range, a frame indicating a focusing zone, a photographing mode of the camera, and other numeric information are displayed as a shadow of the opaque pattern in the field of view of the finder. A liquid crystal display element or the like may be used to display variable information.

In the above-described conventional real-image finder, however, since the display element is disposed in the vicinity of the image plane of the objective optical system on which the eye of a user is focused, when dust particles are adhered on the displaying element during assembling of the finder, the dust particles are conspicuous in the field of view of the finder. If the number of surfaces arranged in the vicinity of the image plane is reduced, the possibility that the dust particles are conspicuous in the field of view is reduced. For this purpose, there has been known an arrangement that the lens of the objective optical system is spaced from the vicinity of the image plane. However, since conventional finders are designed such that the patterns formed on the information display element are directly observed through the eyepiece optical system, the displaying element cannot be positioned apart from the vicinity of the image plane for the clear observation of the patterns. Thus, there still remains a problem that the dust particles are conspicuous in the field of view and prevent observation.

SUMMARY OF THE INVENTION

It is therefore an object of the present invention to provide an improved real-image finder optical system that prevents dust particles from being conspicuous in a field of view even if they are adhered on the elements, including a displaying element, constituting an objective optical system.

For the above object, according to the invention, there is provided a real-image finder optical system that is provided with an information display element located between an image plane of an objective optical system and a moving lens group of the objective optical system, and a partial mirror surface provided on an object side with respect to the information display element. Reflection information patterns are formed on the information display element to reflect a part of light from an object toward the partial mirror. The finder optical system includes the objective optical system having a positive power, an erecting optical system for erecting a reversed real image formed by the objective optical system, and an eyepiece optical system for observing the real image formed by the objective optical system and erected by the erecting optical system. Magnification of the finder optical system varies with the movement of at least one moving lens group of the objective lens system in a direction of an optical axis. When the objective lens group has a plurality of the moving lens groups, the information display element is located between the moving lens group being closest to the eyepiece optical system and the image plane of the objective optical system.

With this construction, a part of light from the object passes through the objective optical system and forms a reversed real image on the image plane. An another part of the light from the object is reflected by the reflection patterns of the information display element toward the object side and the reflected light is further reflected by the partial mirror to form the real image of the reflection patterns in the vicinity of the image plane of the objective optical system. The real images are erected by the erecting optical system. A user can observe the image of the object that is overlapped with the image of the reflection pattern.

The surfaces of elements consisting the objective optical system and the erecting optical system is preferable to be located apart from the image plan of the objective optical system.

It is preferable that the real-image finder optical system satisfies a following condition:

$$0.28 < s/\text{fe} < 0.5,$$

where, s represents a distance in air between a surface of the information display element on which the reflection patterns are formed and the image plane of the objective optical system, and fe represents a focal length of the eyepiece optical system.

Specifically, the partial mirror surface is formed on a surface of a lens included in the objective optical system, the surface may be one of a convex surface on the object side surface of the lens and a concave surface on the eyepiece optical system side surface of the lens.

In particular, the information display element may be a transparent member, mirror finished reflection patterns being formed on a surface of the transparent member. The transparent member may be a lens or a plane parallel plate.

Optionally, the partial mirror surface may be an a spherical surface that prevents aberrations appeared in the image of the information pattern formed on the information display element.

Further optionally, the erecting optical system may include a plurality of optical elements. In such a case, a first element of the electing optical system may be located on an object side with respect to the image plane of the objective lens system, the information display element may be provided on the eyepiece optical system side with respect to the first element, and the partial mirror surface may be provided on the object side with respect to the first element. The first element is the closest element to the object in the elements of the erecting optical system. When the erecting system includes a mirror and a prism arranged in this order from the object side, the first element is the mirror.

BRIEF DESCRIPTION OF THE ACCOMPANYING DRAWINGS

FIGS. 1A and 1B show an arrangement of optical elements of a real-image finder optical system according to embodiments, wherein FIG. 1A shows the arrangement at wide extremity and FIG. 1B shows the arrangement at telescopic extremity;

DETAILED DESCRIPTION OF THE PREFERRED EMBODIMENTS

Embodiments of a real-image finder optical system according to the present invention will be described hereinafter.

Figure 1A:
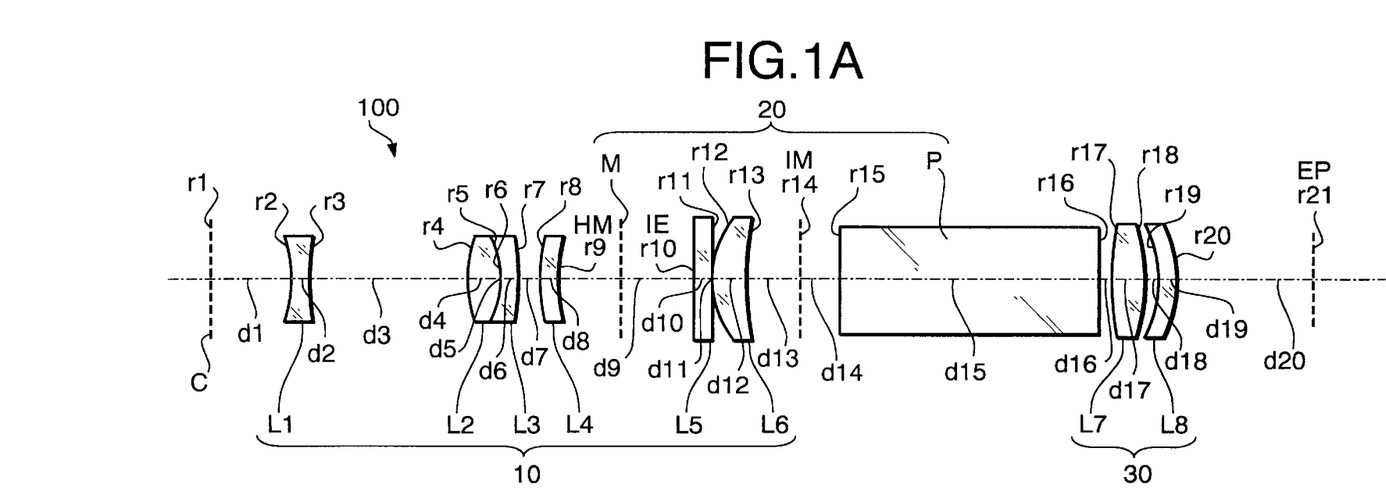
Figure 1B:
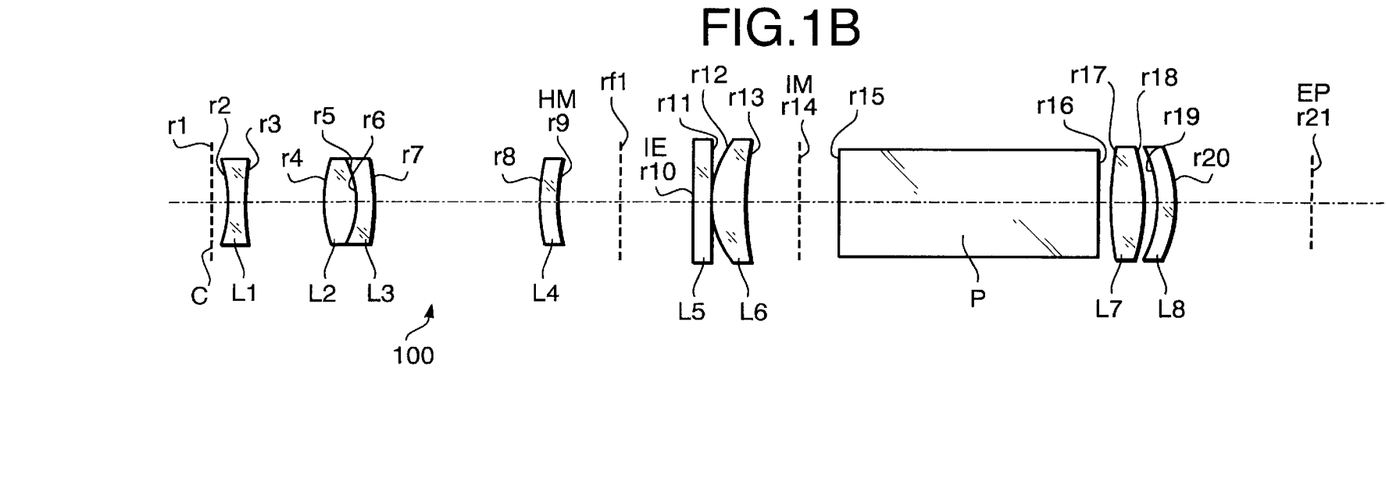

FIGS. 1A and 1B are developments showing an arrangement of optical elements of a variable magnification real-image finder optical system 100 according to the embodiments of the invention. In these figures, a mirror is shown as a flat transparent surface and a prism is shown as a rectangle. FIG. 1A shows the arrangement at wide extremity, FIG. 1B shows the arrangement at telescopic extremity. The finder optical system 100 is provided independently of a photographing optical system in a camera having a zoom photographing lens. Magnification of the finder optical system 100 varies as the focal length of the zoom photographing lens varies.

The real-image finder optical system 100 includes an objective optical system 10 having a positive power as a whole, an erecting optical system 20 for erecting a reversed image formed by the objective optical system 10, and an eyepiece optical system 30 for magnifying the erected image. The objective optical system 10, the erecting optical system 20, and the eyepiece optical system 30 are arranged in this order from an object side that is on the left-hand side in FIGS. 1A and 1B. The numerals r1–r20 in FIG. 1A respectively indicate surfaces of the optical elements counted from the object side, and d1–d20 indicate distances between adjacent surfaces along an optical axis.

The objective optical system 10 includes a first biconcave lens L1, a second biconvex lens L2, a third negative meniscus lens L3, a fourth negative meniscus lens L4, an information display element IE (L5) for displaying information in a field of view of observation and a sixth positive meniscus lens L6 that are arranged in this order from the object side. Symbol C (r1) denotes a reference position of a cover glass and IM (r14) denotes an image plane of the objective optical system 10.

The erecting optical system 20 includes first and second elements. The first element is a flat mirror M and the second element is a prism P such as a Dach prism. The mirror M is disposed in the objective optical system 10 between the fourth lens L4 and the information display element IE.

The eyepiece optical system 30 includes a seventh biconvex lens L7 and a eighth negative meniscus lens L8. EP (r21) denotes an eye point of the finder optical system 100.

The magnification of the finder optical system 100 varies as a first lens group (L1) and second lens group (L2 and L3) move along the optical axis.

The information display element IE included in the objective optical system 10 is a transparent flat plate having mirror-finished reflection patterns formed on the surface r10 on the object side. The reflection patterns include a pattern for showing the frame of a field of view for indicating a photographing range, a pattern for showing the frame of a focusing zone indicating the range of an object to be focused by an automatic focusing mechanism and the like. The reflection patterns are formed by evaporating metal that reflects light incident onto the transparent member. The transparent member of the information display element IE is a plane parallel plate in first and second embodiments as shown in FIGS. 1A and 1B, while the member is a lens in a third embodiment described below.

The concave surface r9 (the eyepiece optical system side surface) of the fourth lens L4 that is located on the object side with respect to the information display element IE is formed to be a partial mirror surface that partly reflects light incident thereon. Specifically, the concave surface r9 is formed to be a half-mirror HM to which a half-mirror coat is applied onto the entire surface thereof in the embodiments. The half-mirror coat is formed of a metal film, which is evaporated, such that a part of light is allowed to pass therethrough and another part of light is reflected thereby.

Figure 2:
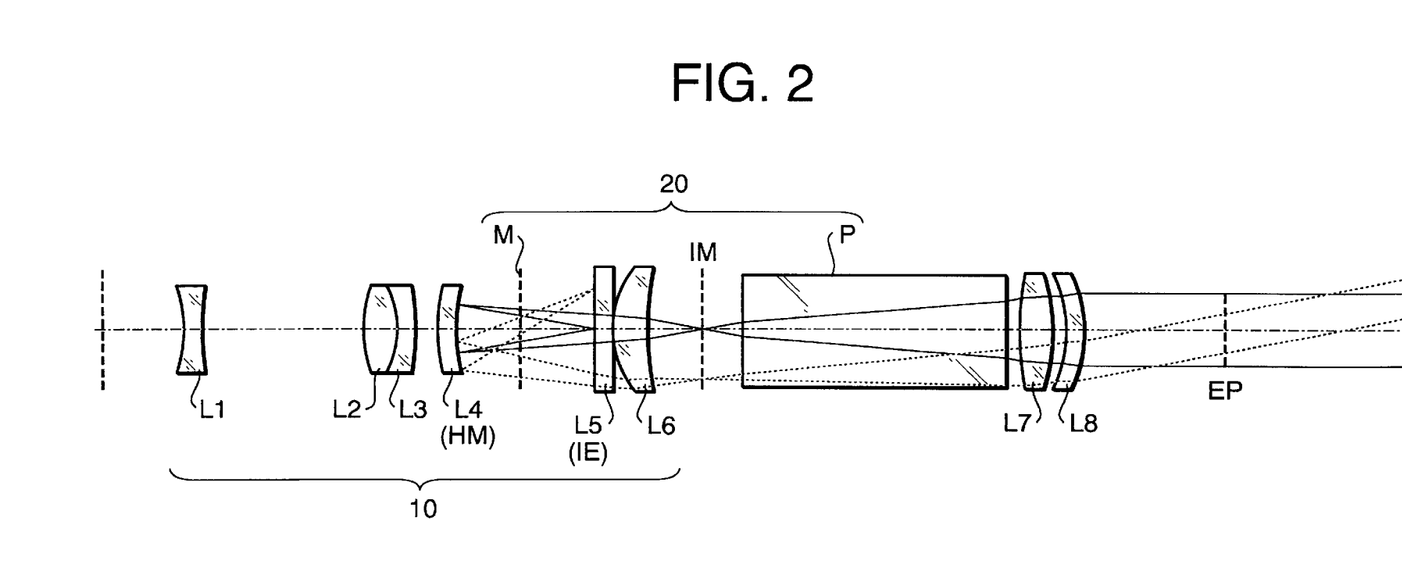
FIG. 2 shows the arrangement of the elements of the real-image finder optical system according to the embodiments with a path of light reflected by an information display element.

With this construction, a part of light from the object at the portion other than the reflection patterns passes through the objective optical system 10 and forms a reversed real image on the image plane IM. As shown in FIG. 2, a light from the object incident on the reflection patterns is reflected by the information display element IE toward the object side and the reflected light is further reflected by the half mirror HM to form the real image of the reflection pattern in the vicinity of the image plane IM. The real images are erected by the erecting optical system 20. A user can observe superimposed images of the object and the reflection patterns in the finder field at the eye point EP. The image of the reflection patterns are observed as a bright image.

The real-image finder optical system 100 satisfies a following condition:

$0.28 < s/fe < 0.5$, where, s represents a distance in air between a surface of the information display element on which the reflection patterns are formed and the image plane of the objective optical system, and fe represents a focal length of the eyepiece optical system.

When s/fe is smaller than 0.28, the information display element IE is too close to the image plane Im of the objective optical system 10, the dust particles adhered on the element IE are conspicuous in the field of view and prevent observation. Further, the reflection pattern is observed as a shadow image (i.e., dark patterns) without being reflected by the half mirror HM.

When s/fe is larger than 0.5, the entire length of the finder optical system 100 becomes too long.

In the embodiments, the reflection patterns on the surface r10 directly face the half mirror HM on the surface r9 without intervention of any lenses therebetween. This arrangement is advantageous since it prevents drop of a transmittance and minimizes a ghost. However, the invention is not limited to such a structure, but another lens may be interposed between the information display element IE and the half mirror HM.

In the embodiments, the surface r9 on which the half mirror HM is formed is an a spherical surface to prevent aberrations appeared in the image of the reflection patterns formed on the information display element IE. Alternatively, if a lens is interposed between the information display element IE and the half mirror HM, aberrations of the optical system contributing to show the information in the finder field may be compensated with the interposed lens without using a spherical surfaces. The half mirror HM should be formed on a surface on the object side of the information display element IE, and it is preferable that the half mirror HM is formed on a concave surface on the eyepiece optical system side or a convex surface on the object side. If the half mirror HM is formed on a surface other than the surface r9, the surface r4 or r8 is preferable for the half mirror HM to be formed.

Hereinafter, the half mirror HM, and the optical elements arranged on the eye side of the half mirror HM will be referred to as an information displaying optical system. Namely, the information displaying optical system is used for observing the reflection patterns formed on the information display element.

The elements of the objective optical system, including the information display element IE, and the prism P constituting the erecting optical system are spaced from the image plane IM of the objective optical system 10. Therefore, even if dust particles are adhered on the surfaces thereof, the eye of the viewer does not focus on the dust particles. Accordingly, the image of the dust particles are not conspicuous in the field of view.

If the dust particles are adhered on the surface of the information display element IE where the reflection patterns are formed, the light reflected by the dust particles is reflected by the half mirror HM and forms an image in the vicinity of the image plane IM. In such a case, however, since the reflectance of the dust particles is generally very low as compared with the reflection ratio of the mirror finished reflection patterns, the image of the dust particles is inconspicuous in the field of view.

Further, since the half mirror HM is formed on the fourth lens L4 that does not move to vary magnification of the finder optical system 100, the information displayed by the information display element IE can be observed in the finder field at constant magnification in spite of varying the magnification of the finder optical system 100. The information display element IE and the fourth lens L4 on which the half mirror HM is formed do not disturb the movements of the first and second lens group (L1, L2 and L3).

The evaporated reflection layer of the half mirror HM shows average reflectance of 30%–60% in a predetermined wavelength range (i.e., 550 nm–600 nm) within the visible wavelength range. If the reflectance is larger than this range, the image of the object becomes too dark to be observed. If the reflectance is lower than this range, the image of the reflection patterns will be indistinct.

Anti-reflection coating is applied to the surface r8, which is the opposite surface to half mirror HM on the fourth lens L4, in order to prevent the unnecessary reflection of the reflected light from the information display element IE. Since a part of the light in the predetermined wavelength range (550 nm–600 nm) is reflected by the half mirror HM and it reduce the intensity of the light in the predetermined range, the anti-reflection coating may prevent the reflection of light in wavelength range other than the predetermined wavelength range (550 nm–600 nm).

Alternatively, the evaporated reflection layer on the half mirror HM may have average reflectance of 20%–50% within the visible wavelength range. The larger reflectance prevents the observation of the image of the object, and the lower reflectance causes indistinct view of the image of the reflection patterns. In this case, anti-reflection coating that prevents the reflection of the visible light may be applied to the surface r8.

Three numerical embodiments of the real-image finder optical system will be described below.

Embodiment 1

Specific numerical arrangement of the first embodiment is indicated in Table 1, which is to be applied to the structure shown in FIGS. 1A and 1B. In Table 1, d0 represents a distance from the reference position of a cover glass (r1) to the object [unit: mm], M represents a magnification of the image of the information displaying element at the image plane of the objective optical system that is formed after reflection by the half mirror HM, s/f is a value of the above described condition, r represents a radius of curvature of the each lens [unit: mm], d represents a thickness of lenses or distance between lenses [unit: mm], nd represents a refractive index of the respective lenses with respect to d-line (588 nm) and vd represents the Abbe's number of each lens. The distances d1, d3 and d7 vary as the magnification of the finder optical system varies. Table 2 shows the variable values at the wide extremity ("wide") and the telescopic extremity ("tele"). In the Table 2, ω represents a real field of view (half an-amount) [unit: degree], β represents an apparent field of view (half an amount) [unit: degree], γ represents a magnification of an entire finder optical system, and D represents diopter of the finder optical system [unit: Dptr]. The value of β and D for the information displaying optical system are also shown in Table 2 in a column of "ref".

TABLE 1

| | d0 = −2938.25 | M = −1.18 | s/f = 0.34 | |
|---|---|---|---|---|
| Surface | r | d | nd | vd |
| r1 | ∞ | variable | | |
| r2 | −10.85 | 1.50 | 1.49176 | 57.3 |
| r3 | 20.60 | variable | | |
| r4 | 8.82 | 2.80 | 1.49176 | 57.3 |
| r5 | 8.91 | 0.20 | | |
| r6 | 8.59 | 1.50 | 1.58547 | 29.8 |

TABLE 1-continued

| | d0 = −2938.25 | M = −1.18 | s/f = 0.34 | |
|---|---|---|---|---|
| Surface | r | d | nd | vd |
| r7 | 21.52 | variable | | |
| r8 | 18.27 | 1.00 | 1.49176 | 57.3 |
| r9 | 16.93 | 13.05 | | |
| r10 | ∞ | 1.00 | 1.51633 | 64.1 |
| r11 | ∞ | 0.10 | | |
| r12 | 8.91 | 2.50 | 1.49176 | 57.3 |
| r13 | 433.14 | 4.91 | | |
| r14 | ∞ | 3.50 | | |
| r15 | ∞ | 22.96 | 1.52580 | 52.1 |
| r16 | ∞ | 1.20 | | |
| r17 | 20.12 | 2.60 | 1.49176 | 57.3 |
| r18 | 20.70 | 1.20 | | |
| r19 | 15.31 | 1.20 | 1.49176 | 57.3 |
| r20 | −15.61 | 12.00 | | |
| r21 | ∞ | −997.53 | | |

| | wide | tele | ref |
|---|---|---|---|
| d1 | 7.28 | 1.5 | |
| d3 | 13.95 | 7.07 | |
| d7 | 2.01 | 14.67 | |
| ω | 25.7 | 12.9 | |
| β | 11.0 | 11.0 | 11.0 |
| γ | 0.43 | 0.80 | 0 |
| D | −1.0 | −1.0 | −1.0 |

In the first embodiment, surfaces r2, r4, r7, r8, r9, r12, r13 and r17 are formed to be rotationally-symmetrical a spherical surfaces. The a spherical surface will be expressed by the following formula that represents a sag amount X(h) at a point on the a spherical surface whose height with respect to the optical axis is h. That is, a distance of the point on the a spherical surface from the tangential plane of the a spherical surface at a point where the optical axis intersects the a spherical surface is represented by X(h).

$$X(h) = ch^2/(1+(1-(1+K)c^2h^2)^{1/2}) + A4h^4 + A6h^6$$

where, c represents the curvature (1/r) of the aspherical surface on the optical axis, K represents a conic coefficient, and A4 and A6 represent fourth-order and sixth-order aspherical surface coefficients, respectively.

The radius of curvature of the aspherical surface indicated in Table 1 is the radius on the optical axis. Table 3 indicates the conic coefficients and aspherical surface coefficients of the aspherical surfaces.

TABLE 3

| Surface | K | A4 | A6 |
|---|---|---|---|
| r2 | 0.0 | 4.090×10⁻⁴ | 2.237×10⁻⁶ |
| r4 | 0.0 | 1.468×10⁻⁵ | 8.006×10⁻⁶ |
| r7 | 0.0 | 3.205×10⁻⁴ | 1.139×10⁻⁵ |
| r8 | 0.0 | −2.336×10⁻⁶ | 6.876×10⁻⁷ |
| r9 | 0.0 | −2.816×10⁻⁵ | 0.000 |
| r12 | 0.0 | −5.082×10⁻⁵ | −3.095×10⁻⁶ |
| r13 | 0.0 | 1.760×10⁻⁴ | 0.000 |
| r17 | 0.0 | −7.354×10⁻⁵ | −9.909×10⁻⁸ |

Figure 3A:
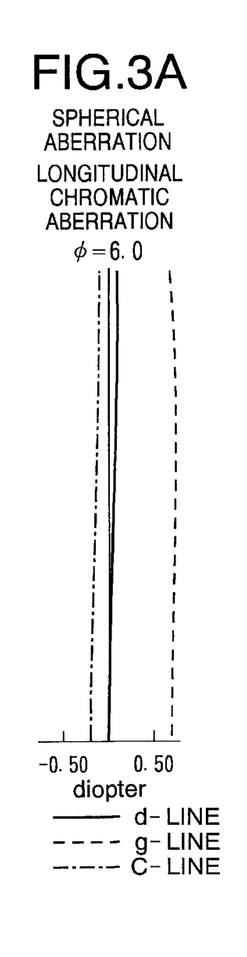
FIGS. 3A–3D are graphs showing aberrations of the finder optical system according to a first embodiment at the wide extremity when an object is observed at an eye point EP.
Figure 3B:
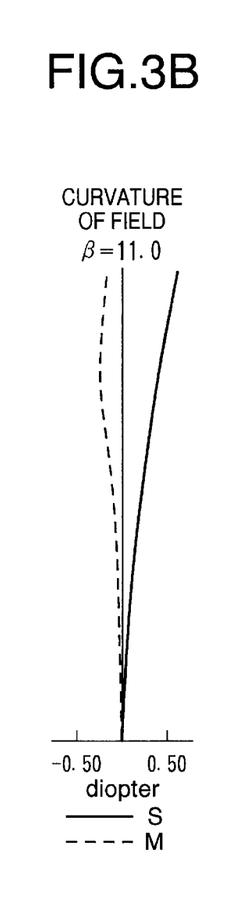
Figure 3C:
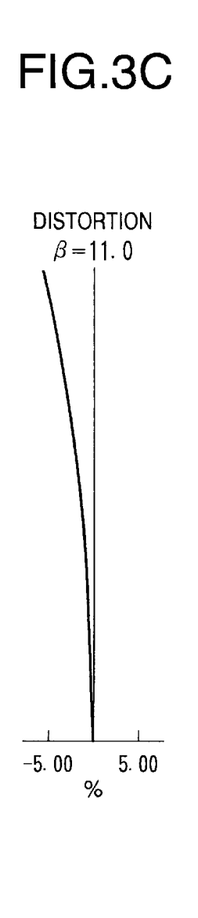
Figure 3D:
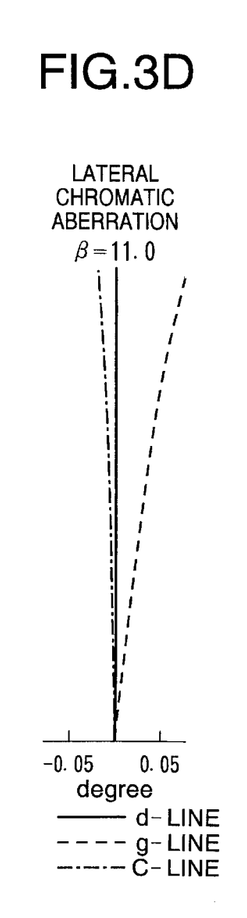

FIGS. 3A, 3B, 3C and 3D show aberrations of the finder optical system according to the first embodiment at the eye point EP when the objective optical system is in the wide extremity. FIG. 3A shows a graph indicating spherical aberration/longitudinal chromatic aberration for d-line, g-line and C-line [unit: diopter] when an exit pupil diameter φ=6.0 mm; FIG. 3B shows a graph indicating curvature of field in sagittal and meridional sections [unit: diopter]; FIG. 3C shows a graph indicating distortion [unit: %], and FIG. 3D shows a graph indicating lateral chromatic aberration for d-line, g-line and C-line, respectively.

Figure 4A:
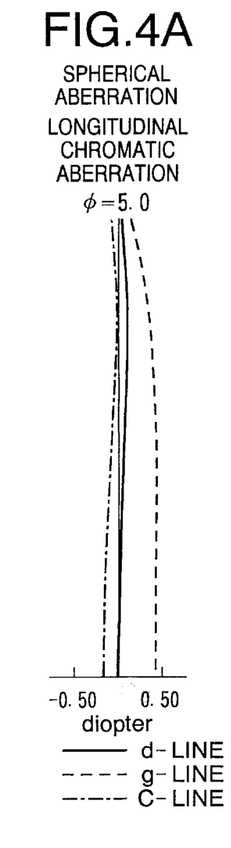
FIGS. 4A–4D are graphs showing aberrations of the finder optical system according to the first embodiment at the telescopic extremity when an object is observed at the eye point EP.
Figure 4B:
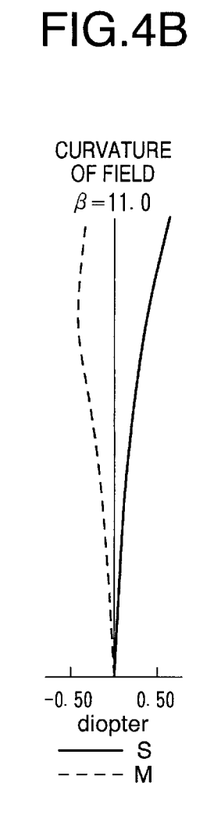
Figure 4C:
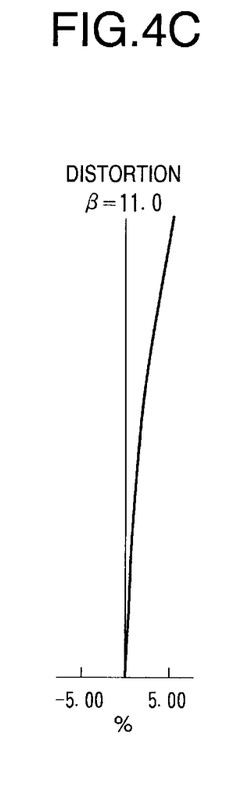
Figure 4D:
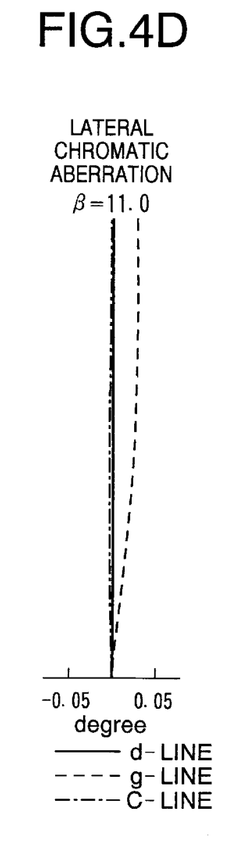

FIGS. 4A, 4B, 4C and 4D show aberrations of the finder optical system according to the first embodiment at the eye point EP when the objective optical system is in the telescopic extremity. FIG. 4A shows a graph indicating spherical aberration/longitudinal chromatic aberration when the exit pupil diameter φ=5.0 mm; FIG. 4B shows a graph indicating curvature of field; FIG. 4C shows a graph indicating distortion, and FIG. 4D shows a graph indicating lateral chromatic aberration.

Figure 5A:
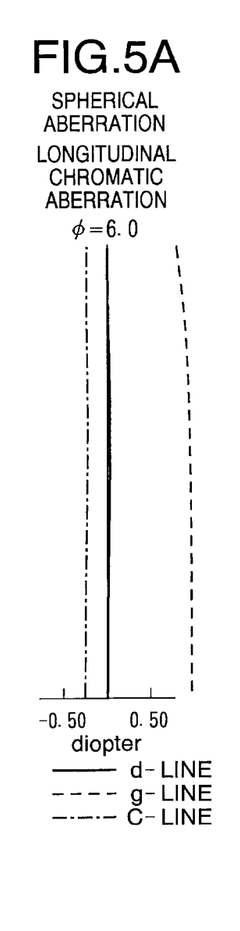
FIGS. 5A–5D are graphs showing aberrations of the finder optical system according to the first embodiment when a reflection patterns on an information display element are observed at the eye point EP.
Figure 5B:
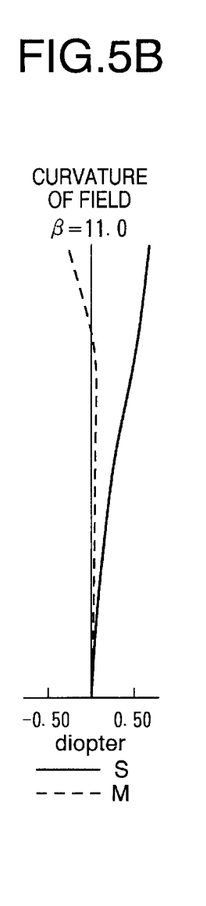
Figure 5C:
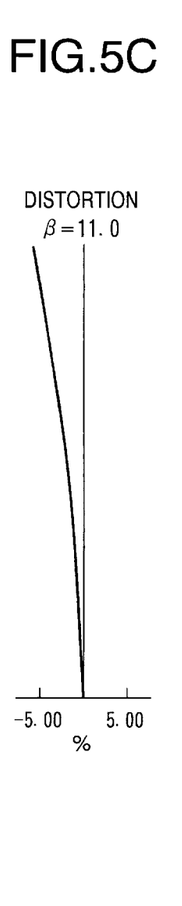
Figure 5D:
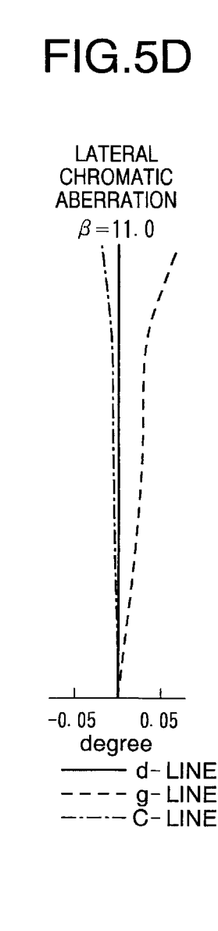
Figure 6A:
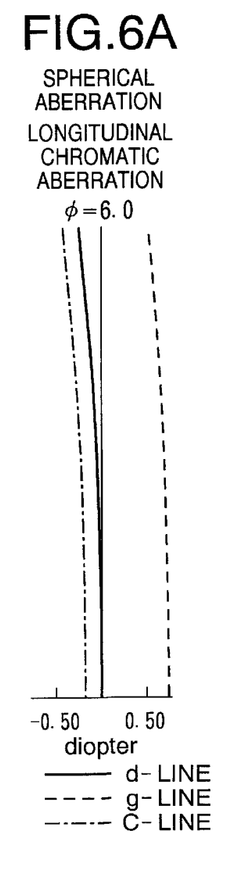
FIGS. 6A–6D are graphs showing aberrations of the finder optical system according to a second embodiment at the wide extremity when an object is observed at an eye point EP.
Figure 6B:
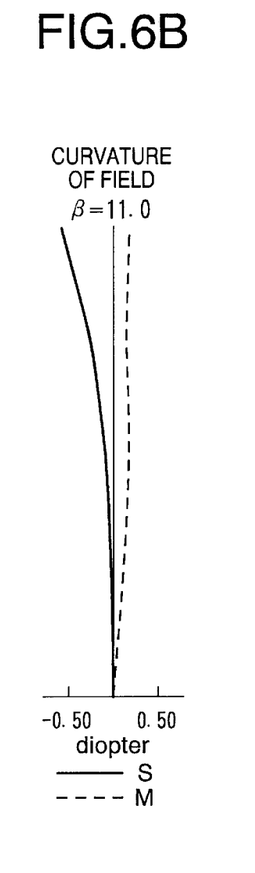
Figure 6C:
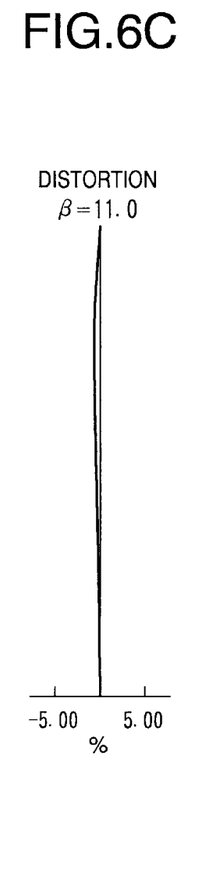
Figure 6D:
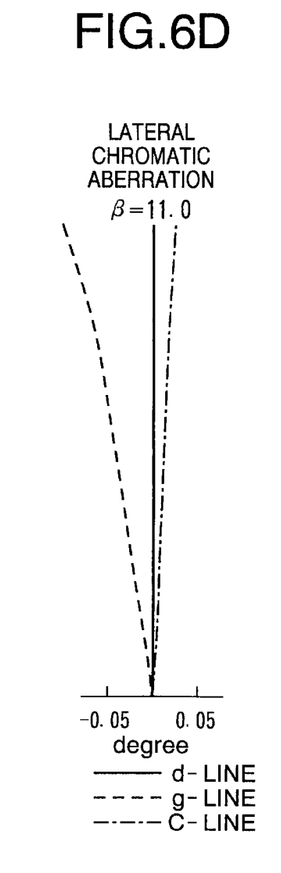
Figure 7A:
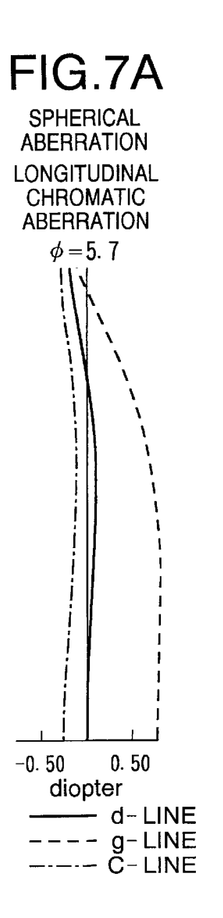
FIGS. 7A–7D are graphs showing aberrations of the finder optical system according to the second embodiment at the telescopic extremity when an object is observed at the eye point EP.
Figure 7B:
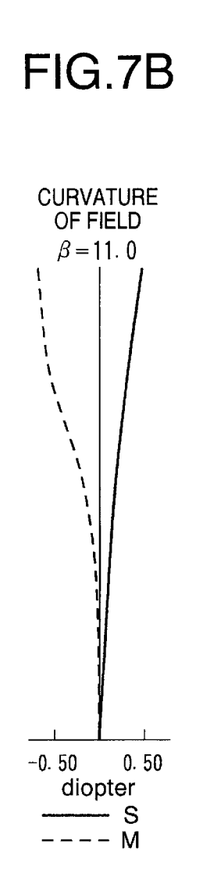
Figure 7C:
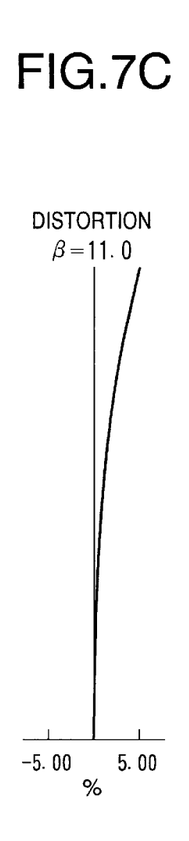
Figure 7D:
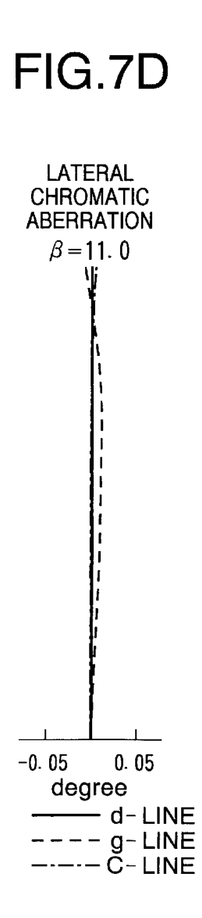
Figure 8A:
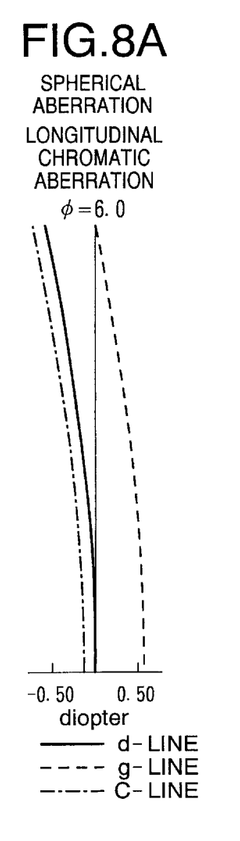
FIGS. 8A–8D are graphs showing aberrations of the finder optical system according to the second embodiment when the reflection patterns on the information display element are observed at the eye point EP.
Figure 8B:
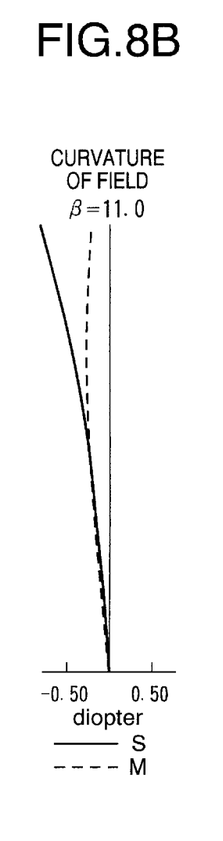
Figure 8C:
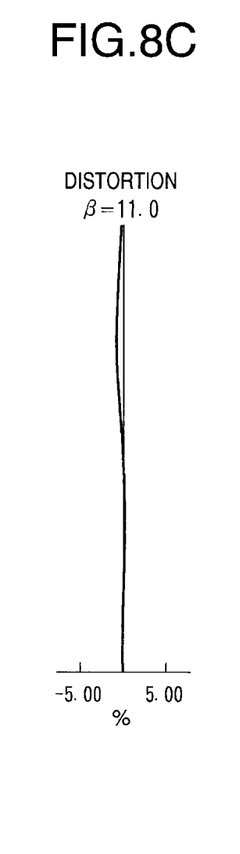
Figure 8D:
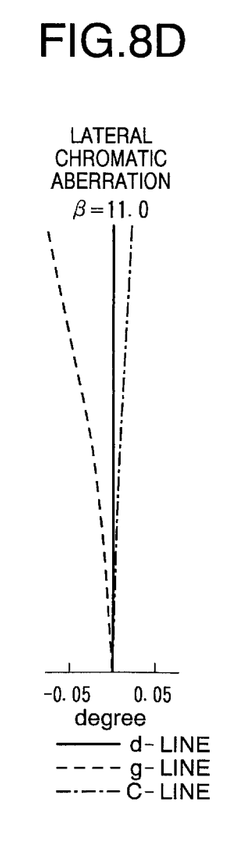
Figure 9A:
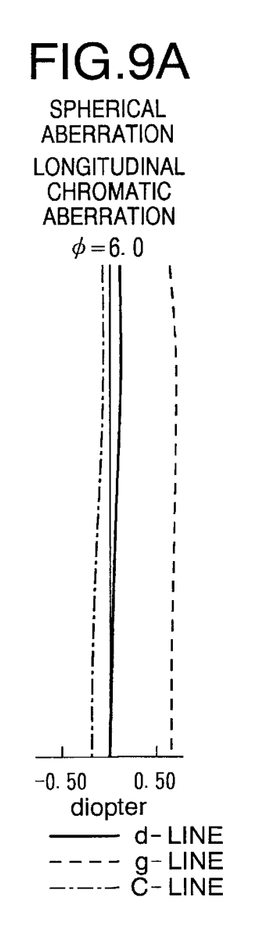
FIGS. 9A–9D are graphs showing aberrations of the finder optical system according to a third embodiment at the wide extremity when an object is observed at an eye point EP.
Figure 9B:
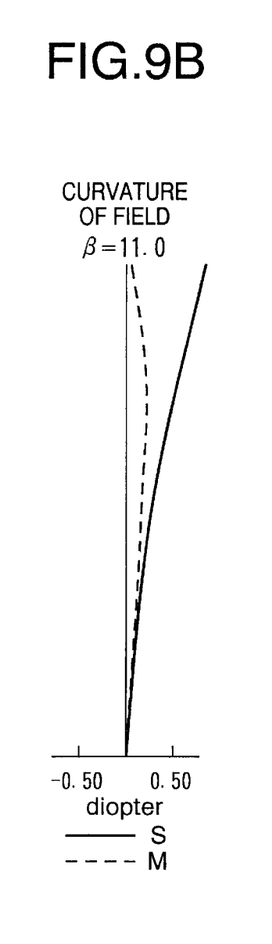
Figure 9C:
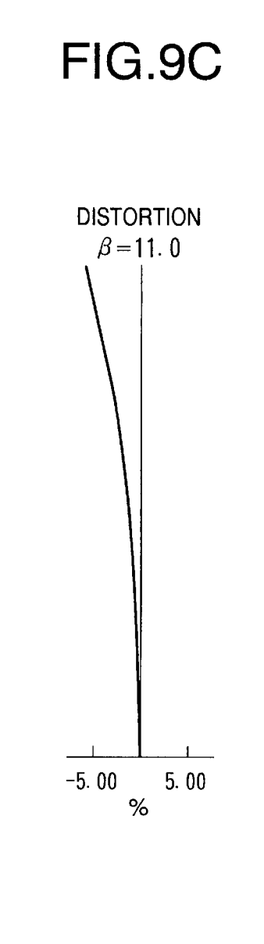
Figure 9D:
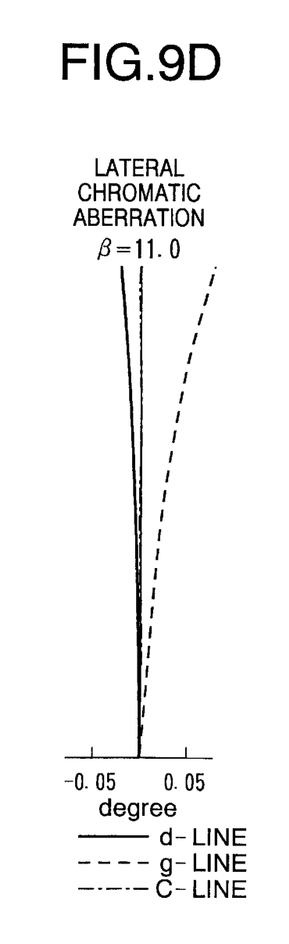
Figure 10A:
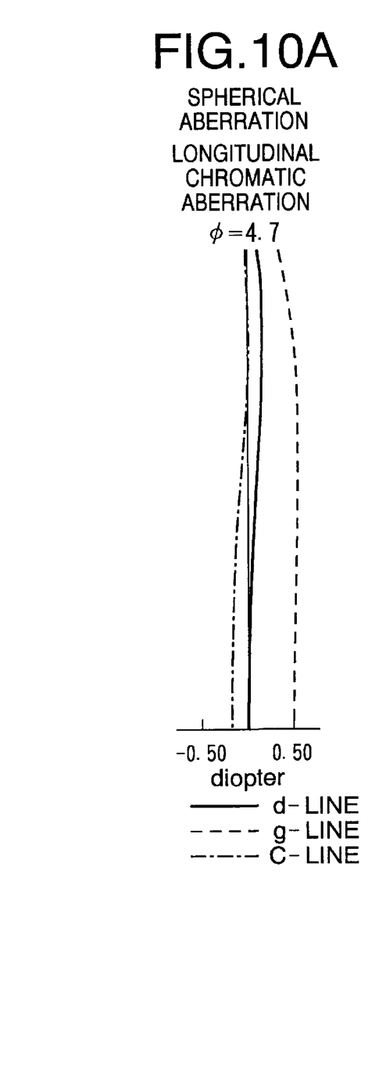
FIGS. 10A–10D are graphs showing aberrations of the finder optical system according to the third embodiment at the telescopic extremity when an object is observed at the eye point EP.
Figure 10B:
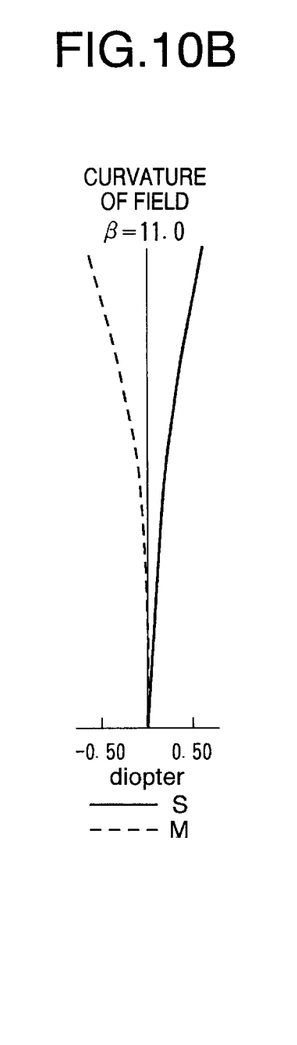
Figure 10C:
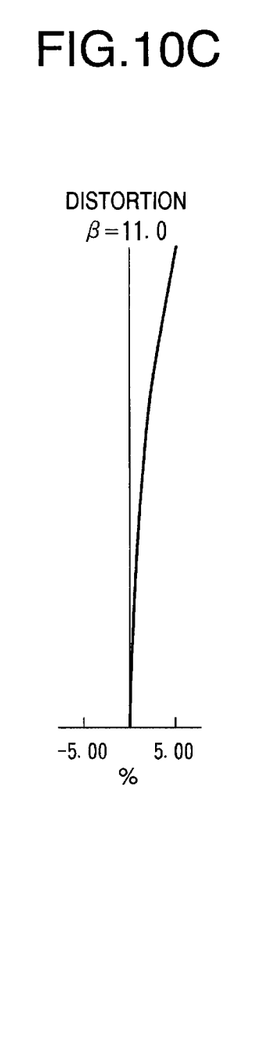
Figure 10D:
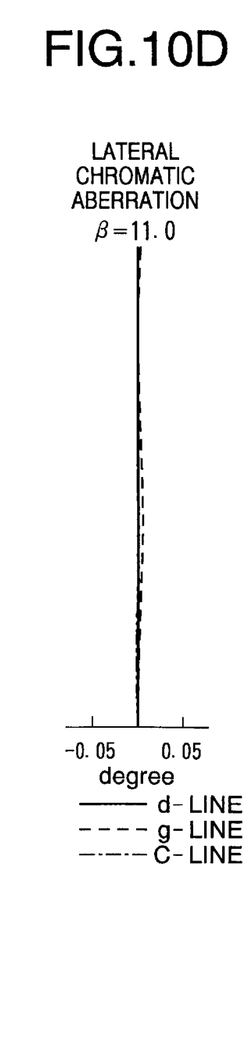
Figure 11A:
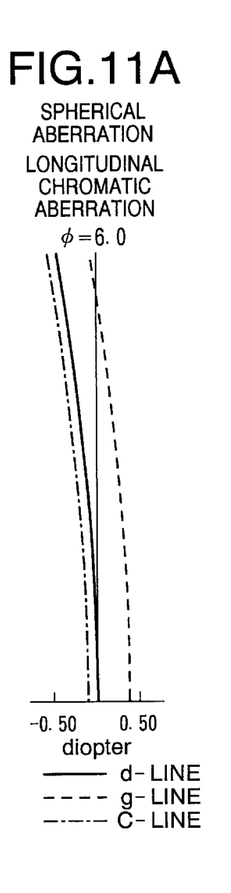
FIGS. 11A–11D are graphs showing aberrations of the finder optical system according to the third embodiment when the reflection patterns on the information display element are observed at the eye point EP.
Figure 11B:
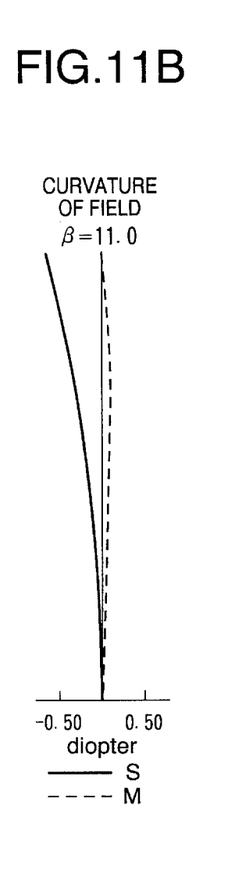
Figure 11C:
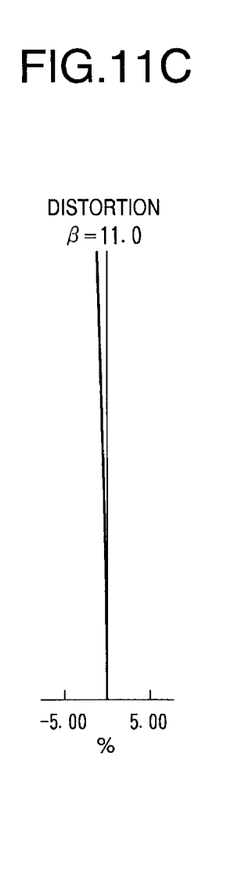
Figure 11D:
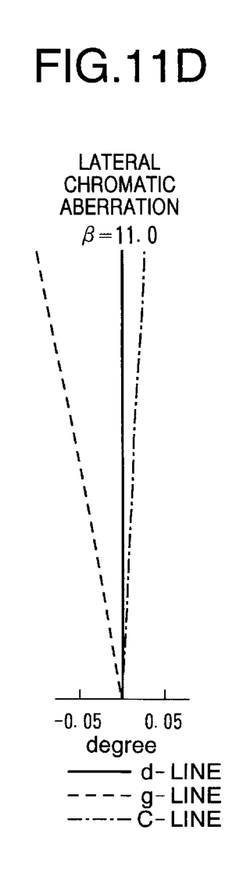

FIGS. 5A, 5B, 5C and 5D show aberrations of the information displaying optical system according to the first embodiment at the eye point EP. FIG. 5A shows a graph indicating spherical aberration/longitudinal chromatic aberration when the exit pupil diameter φ=6.0 mm; FIG. 5B shows a graph indicating curvature of field; FIG. 5C shows a graph indicating distortion, and FIG. SD shows a graph indicating lateral chromatic aberration.

Embodiment 2

Specific numerical arrangement of the second embodiment is indicated in Table 4, which is to be applied to the structure shown in FIGS. 1A and 1B. The information display element IE (L5) is a plane parallel plate and the surface r9 is formed as the half mirror HM. Table 5 shows the variable values. In the second embodiment, surfaces r2, r3, r4, r7, r9, r13 and r17 are formed to be rationally-symmetrical aspherical surfaces. Table 6 indicates the conic coefficients and aspherical surface coefficients of the aspherical surfaces.

TABLE 4

| | d0 = −2938.5 | M = −1.25 | s/f = 0.36 | |
|---|---|---|---|---|
| Surface | r | d | nd | vd |
| r1 | ∞ | variable | | |
| r2 | −11.94 | 1.50 | 1.49176 | 57.3 |
| r3 | 22.30 | variable | | |
| r4 | 10.94 | 2.80 | 1.49176 | 57.3 |
| r5 | −7.23 | 0.19 | | |
| r6 | −6.92 | 1.50 | 1.58547 | 29.8 |
| r7 | −15.08 | variable | | |
| r8 | 17.01 | 1.50 | 1.49176 | 57.3 |
| r9 | 16.21 | 12.15 | | |
| r10 | ∞ | 1.50 | 1.49176 | 57.3 |
| r11 | ∞ | 0.10 | | |
| r12 | 8.15 | 3.00 | 1.49176 | 57.3 |
| r13 | 55.38 | 4.84 | | |
| r14 | ∞ | 3.50 | | |
| r15 | ∞ | 22.96 | 1.52580 | 52.1 |
| r16 | ∞ | 1.20 | | |
| r17 | 22.54 | 3.00 | 1.49176 | 57.3 |
| r18 | −13.50 | 1.20 | | |
| r19 | −10.76 | 1.50 | 1.58547 | 29.8 |
| r20 | −13.86 | 12.00 | | |
| r21 | ∞ | −992.23 | | |

TABLE 5

| | wide | tele | ref |
|---|---|---|---|
| d1 | 7.00 | 1.62 | |
| d3 | 13.67 | 6.69 | |
| d7 | 2.01 | 14.36 | |
| ω | 25.7 | 13.2 | |

TABLE 5-continued

|   | wide | tele | ref |
|---|------|------|-----|
| β | 11.0 | 11.0 | 11.0 |
| γ | 0.43 | 0.78 |  |
| D | −1.0 | −1.0 | −1.0 |

TABLE 6

| Surface | K | A4 | A6 |
|---------|-----|-----|-----|
| r2  | 0.0 | 1.967 ×10⁻⁴ | 0.000 |
| r3  | 0.0 | −1.138 ×10⁻⁴ | 0.000 |
| r4  | 0.0 | 1.880 ×10⁻⁵ | 0.000 |
| r7  | 0.0 | 1.926×10⁻⁴ | 0.000 |
| r9  | 0.0 | −5.420 ×10⁻⁵ | 5.996×10⁻⁷ |
| r13 | 0.0 | 4.626 ×10⁻⁴ | 0.000 |
| r17 | 0.0 | −4.178 ×10⁻⁵ | 0.000 |

FIGS. 6A, 6B, 6C and 6D show aberrations of the finder optical system according to the second embodiment at the eye point EP when the objective optical system is in the wide extremity. FIGS. 7A, 7B, 7C and 7D show aberrations of the finder optical system according to the second embodiment at the eye point EP when the objective optical system is in the telescopic extremity. FIGS. 8A, 8B, 8C and 8D show aberrations of the information displaying optical system according to the second embodiment at the eye point EP.

Embodiment 3

Specific numerical arrangement of the third embodiment is indicated in Table 7, which is to be applied to the structure shown in FIGS. 1A and 1B. The information display element IE (L5) is a negative lens and the surface r9 is formed as the half mirror HM. Table 8 shows the variable values. In the third embodiment, surfaces r2, r3, r4, r7, r9, r13 and r17 are formed to be rationally-symmetrical aspherical surfaces. Table 9 indicates the conic coefficients and aspherical surface coefficients of the aspherical surfaces.

TABLE 7 d0 = −2938.5 mm   M = −1.32   s/f = 0.38

| Surface | r | d | nd | νd |
|---------|------|----------|---------|------|
| r1  | ∞      | variable |         |      |
| r2  | −15.11 | 1.50     | 1.49176 | 57.3 |
| r3  | 12.47  | variable |         |      |
| r4  | 10.90  | 2.80     | 1.49176 | 57.3 |
| r5  | −7.16  | 0.20     |         |      |
| r6  | −6.81  | 1.50     | 1.58547 | 29.8 |
| r7  | −13.05 | variable |         |      |
| r8  | 17.73  | 1.50     | 1.49176 | 57.3 |
| r9  | 15.65  | 11.70    |         |      |
| r10 | ∞      | 1.50     | 1.58547 | 29.8 |
| r11 | 26.03  | 0.10     |         |      |
| r12 | 7.64   | 2.86     | 1.49176 | 57.3 |
| r13 | −55.77 | 5.31     |         |      |
| r14 | ∞      | 3.50     |         |      |
| r15 | ∞      | 22.96    | 1.52580 | 52.1 |
| r16 | ∞      | 1.20     |         |      |
| r17 | 19.77  | 3.20     | 1.49176 | 57.3 |
| r18 | −12.43 | 1.20     |         |      |
| r19 | −10.65 | 1.50     | 1.58547 | 29.8 |
| r20 | −15.80 | 12.00    |         |      |
| r21 | ∞      | −992.10  |         |      |

TABLE 8

|   | wide | tele | ref |
|---|------|------|-----|
| d1 | 7.00 | 1.79 |  |
| d3 | 13.63 | 6.91 |  |
| d7 | 2.01 | 13.94 |  |
| ω | 26.1 | 13.3 |  |
| β | 11.0 | 11.0 | 11.0 |
| γ | 0.42 | 0.78 |  |
| D | −1.0 | −1.0 | −1.0 |

TABLE 9

| Surface | K | A4 | A6 |
|---------|-----|------|------|
| r2  | 0.0 | 3.658×10⁻⁵ | 0.000 |
| r3  | 0.0 | −3.416×10⁻⁴ | 0.000 |
| r4  | 0.0 | −8.847×10⁻⁵ | 0.000 |
| r7  | 0.0 | 1.070×10⁻⁴ | 0.000 |
| r9  | 0.0 | −4.143×10⁻⁵ | 3.100×10⁻⁷ |
| r13 | 0.0 | 6.064×10⁻⁴ | 0.000 |
| r17 | 0.0 | −5.174×10⁻⁵ | 0.000 |

FIGS. 9A, 9B, 9C and 9D show aberrations of the finder optical system according to the third embodiment at the eye point EP when the objective optical system is in the wide extremity. FIGS. 10A, 10B, 10C and 10D show aberrations of the finder optical system according to the third embodiment at the eye point EP when the objective optical system is in the telescopic extremity. FISG. 11A, 11B, 11C and 11D show aberrations of the information displaying optical system according to the third embodiment at the eye point EP.

In the third embodiment, the information display element IE (L5) has a function to compensate aberrations. This allows to shorten the entire length of the finder optical system as compared with the first embodiment without increasing aberrations.

What is claimed is:

1. A real-image finder optical system, comprising:
    an objective optical system having a positive power, at least one moving lens group included in said objective optical system being movable along an optical axis of said objective optical system to change magnification of said finder optical system;
    an erecting optical system for erecting a reversed real image formed by said objective optical system;
    an eyepiece optical system for observing said real image formed by said objective optical system and erected by said erecting optical system;
    an information display element provided in said objective optical system between an image plane of said objective optical system and said moving lens group, said information display element being provided with reflection patterns to reflect a part of an incident light from an object for displaying information to be observed in a field of view of said finder optical system; and
    a partial mirror surface provided on an object side with respect to said information display element, said partial mirror allowing a part of light from said object to pass therethrough and reflecting light from said reflection patterns towards said eyepiece optical system.

2. The real-image finder optical system according to claim 1, wherein surfaces of elements constituting said objective optical system and the erecting optical system are located apart from said image plane.

3. The real-image finder optical system according to claim 1, which satisfying a following condition:

$0.28 < s/fe < 0.5$, wherein, s represents a distance in air between a surface of said information display element on which said reflection patterns are formed and the image plane of said objective optical system, and fe represents a focal length of said eyepiece optical system.

4. The real-image finder optical system according to claim 1, wherein said partial mirror surface is formed on a surface of a lens included in said objective optical system, said surface being one of a convex surface on the object side surface of said lens and a concave surface on the eyepiece optical system side surface of said lens.

5. The real-image finder optical system according to claim 1, wherein said information display element is a transparent member, mirror finished reflection patterns being formed on a surface of said transparent member.

6. The real-image finder optical system according to claim 5, wherein said transparent member is a plane parallel plate.

7. The real-image finder optical system according to claim 5, wherein said transparent member is a lens.

8. The real-image finder optical system according to claim 1, wherein said erecting optical system includes a plurality of reflection surfaces, one of said reflection surfaces being a mirror and the other reflection surfaces being formed as at least one prism, said mirror of said erecting optical system being located between said partial mirror surface and said information display element.

9. The real-image finder optical system according to claim 1, wherein said partial mirror surface is an aspherical surface that prevents aberrations appeared in the image of the information pattern formed on said information display element.

10. The real-image finder optical system according to claim 1, wherein said partial mirror surface is provided on a side of said eyepiece optical system with respect to all of said moving lens group.

11. A real-image finder optical system, comprising:

an objective optical system having a positive power, at least one lens included in said objective optical system being movable along an optical axis of said objective optical system to change magnification of said finder optical system;

an erecting optical system for erecting a reversed real image formed by the objective optical system, a first element that is closest to an object in said erecting optical system being located on an object side with respect to an image plane of said objective lens system;

an eyepiece optical system for observing said real image formed by said objective optical system and erected by said erecting optical system;

an information display element provided in said objective optical system on the eyepiece optical system side with respect to said first element of said erecting optical system, said information display element being provided with reflection patterns to reflect a part of an incident light from an object for displaying information to be observed in a field of view of said finder optical system; and a partial mirror surface provided on an object side with respect to said first element of said erecting optical system, said partial mirror surface allowing a part of light from said object to pass therethrough and reflecting light from said information display element towards said eyepiece optical system.

12. The real-image finder optical system according to claim 11, wherein said erecting optical system includes a plurality of reflection surfaces, one of said reflection surfaces being a mirror and the other reflection surfaces being formed as at least one prism, said first element of said erecting optical system being said mirror.

13. The real-image finder optical system according to claim 11, wherein surfaces of elements constituting said objective optical system and the erecting optical system are located apart from an image plane of said objective optical system.

14. The real-image finder optical system according to claim 11, wherein said partial mirror surface is formed on a surface of a lens included in said objective optical system, said surface being one of a convex surface on the object side surface of said lens and a concave surface on the eyepiece objective optical system side surface of said lens.

15. The real-image finder optical system according to claim 11, wherein said partial mirror surface is a half mirror surface having an aspherical shape.

* * * * *